United States Patent Office 2,738,801
Patented Mar. 20, 1956

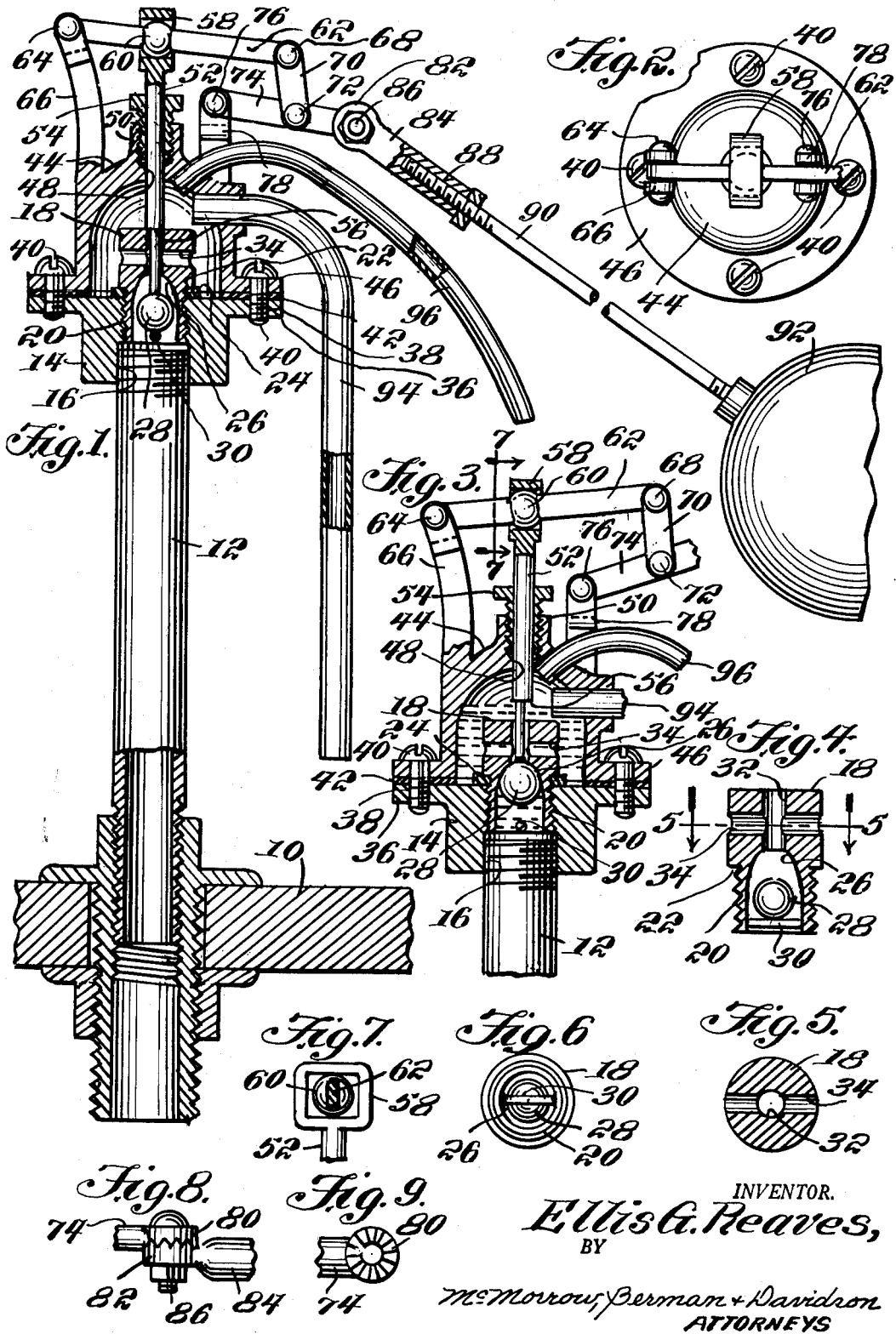

2,738,801

FLOAT VALVE ASSEMBLY FOR FLUSH TANKS

Ellis G. Reaves, Jackson, Tenn.; Bessie Louise Reaves, administratrix of said Ellis G. Reaves, deceased Application July 31, 1953, Serial No. 371,501

2 Claims. (Cl. 137—426)

This invention relates to a float valve assembly for flush tanks, and more particularly, has reference to an assembly of the type stated characterized by its being free of compressible rubber washers and similar devices.

Conventionally, a float valve assembly for a flush tank includes a rubber washer which is compressed against a valve seat on upward movement of the float ball. This arrangement, it has been found, results in rapid wearing of the rubber washer, as a result of which the valve begins to leak, after a period of time. Additionally, rust scale from the city water main tends to engage against the washer, producing a still greater tendency on the part of the valve assembly, toward leakage during operation.

The main object of the present invention is to provide a generally improved float valve assembly for flush tanks which will be so designed as to require no washers or other rapidly wearing parts. Summarized briefly, the float valve assembly constituting the present invention has been formed, to this end, with a valve body having a recess facing downwardly into the conventional water supply pipe of the flush tank. Loosely mounted in the recess is a metallic ball valve movable toward and away from a valve seat defined by the inner end of the recess. Normally, the ball valve is maintained in engagement with its associated valve seat by pressure of water within the water supply pipe. However, in accordance with the invention, a plunger mounted for up and down movement in the valve body is shiftable into engagement with the ball when the level of water drops within the flush tank, thereby to unseat the ball and permit passage of water out of the water supply pipe. The construction, in this regard, is so designed as to eliminate washers, and instead of this conventional arrangement, there is provided a metal ball valve and a metal seat, either or both of which can wear without affecting the tightness of the engagement therebetween when the valve is in closed position.

Another object of importance is to provide a float valve assembly of the type stated which will be so designed as to permit the same to be readily disassembled when individual parts are to be replaced.

Another object of importance is to provide a float valve assembly as described which will be so designed as to be sure in operation, and operable over an indefinite period of time without requiring maintenance.

Yet another object is to provide an assembly of the character stated which will be so designed as to eliminate crevices and other locations in which rust scale might otherwise tend to lodge.

Still another object is to provide a float valve assembly which, despite the novel design thereof, will yet be mountable upon a conventional water supply pipe, as a unitary assemblage of parts.

Other objects will appear from the following description, the claims appended thereto, and from the annexed drawing, in which like reference characters designate like parts throughout the several views, and wherein:

Figure 1 is a view partly in side elevation and partly in longitudinal section of the valve assembly formed in accordance with the present invention, the parts being shown in open position;

Figure 2 is a top plan view in which the float and its associated rod has been broken away;

Figure 3 is a fragmentary view similar to Figure 1 showing the parts in closed position;

Figure 4 is a longitudinal sectional view of the valve body per se;

Figure 5 is a transverse sectional view on line 5—5 of Figure 4;

Figure 6 is a bottom plan view of said valve body;

Figure 7 is a sectional view on line 7—7 of Figure 3;

Figure 8 is a fragmentary elevational view showing the adjustable connection between portions of the float rod; and Figure 9 is a fragmentary elevational view of one of the portions of the float rod, per se.

The reference numeral 10 has been applied in the drawing to the bottom of a conventional flush tank, equipped with the usual upstanding water supply pipe 12. The water supply pipe is exteriorly threaded at its upper end, in the usual manner, and threadedly mounted upon the upper end of the water supply pipe is a sleeve-like valve base 14. The valve base 14 has an end to end, threaded bore 16, the water supply pipe 12 engaging in the lower end of said bore. A valve body has been designated by the reference numeral 18, and is of cylindrical formation, said valve body having at its lower end a reduced externally threaded portion 20 engageable in the upper end of the bore 16.

The provision of the reduced portion 20 defines, in the valve body 18, a circumferential shoulder 22 engageable against a fiber gasket 24 adapted to be circumposed about the upper end of the bore 16 of the base 14.

Referring particularly to Figure 4, the valve body 18 is formed, in its lower end, with a downwardly facing recess 26 the inner end of which is curved to provide a seat 26 for a valve ball 28. The valve ball 28 is loose within the recess, and is held therein by a cross pin 30 extending diametrically across the lower or outer end of the recess.

Formed in the valve body 18 is a transverse passage 34, said passage communicating intermediate its ends with a longitudinal bore 32. The bore 32 extends from the upper end of the valve body to the recess 26, and it will be appreciated that on movement of the ball valve 28 off its seat, water maintained under pressure in the water supply pipe is permitted movement into the bore 32, said water thereafter passing out of the opposite ends of the passage 34. The passage 34 thus provides a pair of outlet ports in the valve body, through both of which water may flow whenever the parts are in open position as in Figure 1.

Integrally formed upon the base 14, at the upper end thereof, is a circumferential, flat flange 36 formed with equidistantly spaced openings 38 threaded for engagement of screws 40 therein. An annular, flat, rubber gasket 42 is seated upon the flange 36, and has openings registering with the openings 38, the screws passing through the registering openings of the gasket and flange.

A dome-like cover 44 is formed, at its lower end, with a circumferential, outwardly directed flange 46 adapted to seat upon the rubber gasket 42. Flange 46 has circumferentially spaced openings registering with the openings of the rubber gasket and flange 36, the screws 40 extending through the openings of flange 46, thereby to fixedly but removably connect the cover to the valve base.

When the cover is connected to the valve base in this manner, there is defined a chamber within which the valve body 18 is disposed (Figures 1 and 3). Water flowing out of the passage 34 fills the chamber, so as to be discharged into the flush tank in a manner to be presently apparent.

Centrally formed in the dome-like cover is a bore 48, said bore opening through an upstanding boss 50 integrally formed upon the cover. A cylindrical, elongated plunger 52 is slidably mounted in the bore 48 for up and down movement, the bore 48 having a threaded counterbore receiving a packing nut 54 for the purpose of preventing leakage during the movement of the plunger.

The plunger 52, adjacent the lower end thereof, has a circumferential shoulder 56 which is adapted to engage against the upper end surface of the valve body 18 to limit downward movement of the plunger. The plunger is shown in its downwardly shifted position in Figure 1, and as will be noted, the provision of the shoulder defines a reduced shank or tip portion at the lower end of the plunger, which tip portion extends through the bore 32 into engagement with the ball valve. The tip portion is substantially smaller in diameter than the diameter of the bore 32, thus to prevent the tip portion from interfering with the passage of water through the bore 32 into the passage 34 when the ball valve is unseated.

The upper end of the plunger projects a substantial distance above the packing nut, and is integrally formed with an eye 58. Disposed within said eye is a globular formation 60 integrally formed upon the mid-length portion of a lever 62. The globular portion 60, being in engagement with the top and bottom surfaces of the eye, provides a fulcrum for the lever 62, thereby permitting the lever 62 to have free up and down rocking movement.

At one end, the lever 62 is pivotally connected as at 64 to the upper end of an upwardly projecting arm 66 integrally provided upon the dome-like cover 44. The lever 62 is thus mounted upon the dome-like cover for up and down rocking movement, and it will be understood that when the lever is swung upwardly from the position shown in Figure 1, about the axis of the pivotal connection 64, it will shift the plunger 52 upwardly to the position shown in Figure 3. As a result, the reduced tip portion of the plunger will be wholly recessed within the bore 32, thereby permitting the ball valve 28 to seat itself under the pressure of water flowing upwardly within the water supply pipe. In this way, the valve is effectively closed.

That end of the lever 62 remote from the pivotal connection 64 is pivotally connected at 68 to the upper ends of a pair of side by side, parallel links 70. The links 70, at their lower ends, embrace between them the mid-length portion of an inner float rod portion 74. Rod portion 74 is pivotally connected at 76 to the bifurcated upper end of an upstanding support arm 78 integrally formed upon the dome-like cover 44.

The lower ends of the links 70 are pivotally connected at 72 to the mid-length part of the inner rod portion 74, and accordingly, when the rod portion 74 is rocked upwardly about the axis of the pivotal connection 76, the links 70 will be shifted upwardly, so as to swing the lever 62 to its upper position shown in Figure 3.

Integrally formed upon the outer end of the rod portion 74 is a generally flat, circular enlargement 80 having one face formed with a circumferential series of radially extending teeth adapted to mesh with complementary teeth formed upon the flat, circular enlargement 82 of an intermediate rod portion 84. The toothed enlargements of the rod portions 74, 84 have registering openings through which a connecting bolt 86 extends, a nut being applied to said bolt for the purpose of holding the rod portions in selected positions to which they are swingably adjusted relative to one another.

The rod portion 84 is formed, at its outer end, with an axial, threaded socket 88 in which is engageable an elongated outer rod portion 90. A float ball 92 of conventional design is connected to the outer end of the portion 90, and rises and falls with the level of the water in the flush tank.

Extended into communication with the interior of the chamber hereinbefore described is a fill tube 94; said fill tube providing an outlet for the cover, through which water can flow into the flush tank when the parts are in open position. A refill tube 96 is also extended into communication with the interior of the cover.

In use, the dropping of the water level will cause the float 92 to shift downwardly, and as a result, the lever 62 will be swung downwardly so as to depress the plunger, thereby to unseat the ball valve and permit replenishing of the water within the flush tank. Subsequently, as the level rises, the float 92 will move upwardly to an extent sufficient to permit the ball valve to seat itself tightly against the inner end of the recess, thereby to close the valve, awaiting its next use.

It will be observed that the construction illustrated and described eliminates the use of compressible rubber washers and equivalent devices, which tend to wear with undesirable rapidity. The ball valve and its associated seat, of course, will wear to some extent over a long period of time, but such wear will not affect adversely the tightness of the engagement therebetween, thus preventing leakage of the valve assembly.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A float valve assembly for flush tanks comprising: a base connectible to the upper end of an upstanding supply pipe of a flush tank; a valve body secured to said base in the path of water flowing upwardly out of the pipe and having a recess faced downwardly toward the supply pipe with said recess having at its inner end a valve seat; a ball valve loose within the recess and shiftable onto and off said seat, said ball valve being disposed to shift against said seat under pressure of water flowing upwardly out of the pipe, thus to prevent passage of the water through the valve body, the valve body having outlet means communicating with said seat to permit flow of water out of the valve body on movement of the ball off the seat; a dome-like, hollow cover mounted upon said base above the valve body, said cover defining a chamber surrounding the body and into which the water will flow after passage of the same out of the valve body, the cover having an outlet opening for passage of the water out of the chamber into a flush tank; a plunger mounted in the cover for up and down movement and having a tip extending into the valve body for engaging the ball, whereby to shift the ball off its seat on downward movement of the plunger; and a float operatively connected to the plunger to control up and down movement thereof, said cover and valve body being removably connected to said base independently of one another, said cover being vertically shiftable off the base when disconnected therefrom to expose the valve body, the exposed valve body being vertically shiftable off the base when disconnected therefrom to expose said ball.

2. A float valve assembly for flush tanks for mounting upon the upper end of an upstanding flush tank supply pipe, comprising: a base adapted to be fixedly connected to said upper end of the supply pipe; a valve body secured to said base in the path of water flowing upwardly out of the pipe, and having a recess faced downwardly toward the supply pipe with said recess having a valve seat at its inner end; a ball valve loose within the recess and shiftable onto and off of said seat, said ball valve being disposed to shift against said seat under pressure of water flowing upwardly out of the pipe, thus to prevent passage of the water through the valve body, the valve body having outlet means communicating with said seat to permit flow of water out of the valve body on movement of the ball off the seat; a dome-like, hollow cover mounted upon said base above the valve body, said cover being wholly spaced from the valve body to define a chamber surrounding the body into which the water will flow after passage of the same through said outlet means, the cover having an outlet opening for passage of the water out of the chamber into the flush tank, said cover and valve body being removably connected to the base independently of one another, said cover being shiftable upwardly off the base when disconnected therefrom to expose the valve body, and the exposed valve body being shiftable upwardly off the base when disconnected therefrom to expose the ball; a plunger mounted in the cover of up-and-down movement and having a lower end extending into the valve body for engaging the ball, whereby to shift the ball downwardly off its seat on downward movement of the plunger; an arm rigid with and projecting upwardly from said cover adjacent the plunger; a lever pivotally connected at one end to said arm for up-and-down swinging movement, said lever having a pivotal connection intermediate its ends to the upper end of the plunger, whereby to shift the plunger upwardly and downwardly responsive to vertical swinging movement of the lever; a depending link pivotally connected at one end to the other end of the lever; an inner float rod portion pivotally connected intermediate its ends to the other end of said link, said portion being pivotally connected at one end to the cover for up-and-down swinging movement; an outer float rod portion having a connection at one end to the other end of the inner float rod portion, said connection of the float rod portions being adapted for fixedly joining the same in selected positions of angular relation; and a float carried by the other end of said outer float rod portion, said plunger, arm, lever, link, float rod portions, and float being carried wholly by said cover and being removable as a unit bodily with the cover on disconnection of the cover from said base.

References Cited in the file of this patent
UNITED STATES PATENTS

| 1,623,374 | Anderson | Apr. 5, 1927 |

FOREIGN PATENTS

| 4,380 of 1899 | Great Britain | Feb. 28, 1899 |